United States Patent
Todd et al.

(10) Patent No.: US 9,424,187 B1
(45) Date of Patent: *Aug. 23, 2016

(54) POLICY-BASED STORAGE OF PORTIONS OF AN OBJECT IN A MULTI-TIERED STORAGE SYSTEM

(71) Applicant: EMC Corporation, Hopkinton, MA (US)

(72) Inventors: Stephen J. Todd, Shrewsbury, MA (US); Scott Ostapovicz, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/581,399

(22) Filed: Dec. 23, 2014

Related U.S. Application Data

(63) Continuation of application No. 13/630,378, filed on Sep. 28, 2012, now Pat. No. 8,918,586, and a continuation of application No. 13/630,408, filed on Sep. 28, 2012, now Pat. No. 8,935,474.

(51) Int. Cl.
  *G06F 12/00* (2006.01)
  *G06F 12/08* (2016.01)

(52) U.S. Cl.
  CPC ............ *G06F 12/08* (2013.01); *G06F 12/00* (2013.01)

(58) Field of Classification Search
  None
  See application file for complete search history.

(56) References Cited

U.S. PATENT DOCUMENTS

| | | |
|---|---|---|
| 7,451,225 B1 | 11/2008 | Todd et al. |
| 7,526,553 B1 | 4/2009 | Todd et al. |
| 7,565,493 B1 | 7/2009 | Todd et al. |
| 7,565,494 B1 | 7/2009 | Todd et al. |
| 8,984,027 B1 * | 3/2015 | Patwardhan ...... G06F 17/30079 707/809 |
| 2010/0082546 A1 | 4/2010 | Sreenivas et al. |
| 2012/0096057 A1 | 4/2012 | Cameron |

* cited by examiner

*Primary Examiner* — Kevin Verbrugge
(74) *Attorney, Agent, or Firm* — Krishnendu Gupta; Joseph D'Angelo

(57) ABSTRACT

Some embodiments are directed to an object addressable storage (OAS) system that stores a plurality of objects, a method for use in an OAS system and at least one non-transitory computer readable storage medium encoded with instruction that, when executed by a computer perform a method for use in an OAS system. A tiered storage environment comprising a plurality of storage tiers may be used. In response to a command, metadata associated with the object and a policy may be accessed. A storage tier may be selected for one or more portions of the object based on the policy and the metadata associated with the object.

20 Claims, 13 Drawing Sheets

POLICY-BASED STORAGE OF PORTIONS OF AN OBJECT IN A MULTI-TIERED STORAGE SYSTEM

CROSS-REFERENCE TO RELATED APPLICATIONS

This application is a continuation of and claims the benefit under 35 U.S.C. §120 of U.S. patent application Ser. No. 13/630,378, titled "POLICY-BASED STORAGE OF OBJECT FRAGMENTS IN A MULTI-TIERED STORAGE SYSTEM," filed on Sep. 28, 2012, and U.S. patent application Ser. No. 13/630,408, titled "POLICY-BASED STORAGE OF OBJECT FRAGMENTS IN A MULTI-TIERED STORAGE SYSTEM," filed on Sep. 28, 2012, both of which are hereby incorporated by reference in their entirety.

TECHNICAL FIELD

The present invention relates to the storage of object fragments in a computer system using a multi-tiered storage system.

BACKGROUND

Some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which the host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

The eXtensible Access Method (XAM) proposal is a proposed standard, that employs content addressable storage techniques, that is being developed jointly by members of the storage industry and provides a specification for storing and accessing content and metadata associated with the content. In accordance with XAM, an "XSet" is a logical object that can be defined to include one or more pieces of content and metadata associated with the content, and the XSet can be accessed using a single object identifier (referred to as an XUID). As used herein, a logical object refers to any logical construct or logical unit of storage, and is not limited to a software object in the context of object-oriented systems.

As discussed above, an XSet can store one or more pieces of content, referred to as fragments. For example, an XSet can be created to store a photograph and the photograph itself can be provided as a first "stream" to the XSet. One or more files (e.g., text files) can be created to include metadata relating to the photograph, and the metadata file(s) can be provided to the XSet as one or more additional streams. Once the XSet has been created, a XUID is created for it so that the content (e.g., the photograph) and its associated metadata can thereafter be accessed using the single object identifier (e.g., its XUID). A diagram of an illustrative XSet 100 is shown in FIG. 1. As shown in FIG. 1, XSet 100 includes a number of streams for storing user provided content and metadata. The XSet may also include a number of additional fields 103 that store other types of metadata for the XSet, such as, for example, the creation time for the XSet, the last access time of access of the XSet, and/or any retention period for the XSet.

In XAM, each field or stream in an XSet may be designated as binding or non-binding. Binding fields and streams are used in computing the XUID for the XSet, while non-binding fields and streams are not. That is, the XUID for an XSet is computed based on the content of the binding fields and streams (e.g., by hashing the content of these fields and streams), but not based on the non-binding fields and streams. The designation of certain fields and/or stream as binding may change. Re-designating as binding a field or stream that had been previously designated as non-binding causes the XUID for the XSet to change. Similarly, re-designating a field or stream as non-binding that had previously been designated as binding causes the XUID for the XSet to change.

Because the XUID for an XSet is generated using the content of the binding fields and streams, the binding fields and streams of the XSet cannot be changed once the field becomes binding (though these fields and streams can be re-designated as non-binding and then changed). A request to modify a binding field or stream will result in a new XSet with a different XUID being created.

Some storage systems have "tiers" implemented by storage devices with different storage characteristics. One tier may provide fast access to data and may serve as a transactional storage tier. Such a tier, for example, may be implemented with memory in a server that accesses the data or in a network attached storage (NAS) device. Another tier may be implemented with fixed content storage. Such a tier, for example, may be implemented with a tape or other bulk storage that can store large amounts of data inexpensively, but requires more time to access. A content addressable storage (CAS) system also may be used to implement a fixed content storage tier.

SUMMARY

Some embodiments are directed to a method of operating an object addressable storage system that stores a plurality of objects and provides an object addressable interface via which at least some of the plurality of objects are accessible.

An object accessible via the object addressable interface may be accessible via an object identifier and the object may include a plurality of fragments. The object addressable storage system may be implemented in a tiered storage environment comprising a plurality of storage tiers. The method of operating this system may include, based on a command provided to the object addressable interface to perform a storage operation on the object, for each fragment of at least a portion of the plurality of fragments: accessing metadata associated with the fragment; accessing a policy; and selecting a storage tier of the fragment based on the policy and the metadata associated with the fragment.

Some embodiments are directed to an object addressable storage system that stores a plurality of objects. Each of the plurality of objects may be accessible via an object identifier and may consist of a plurality of fragments. The object addressable storage system may be implemented in a tiered storage environment with a plurality of storage tiers. The object addressable storage system may include an interface via which at least some of the plurality of objects are accessible. The interface may be configured to, in response to a command to perform a storage operation on an object, for each fragment of at least a portion of the plurality of fragments of the object: access metadata associated with the fragment; access a policy; and select a storage tier of the fragment based on the policy and the metadata associated with the fragment.

Some embodiments are directed to at least one non-transitory computer readable medium encoded with computer executable instruction that, when executed by a computer, perform a method for use in an object addressable storage system that stores a plurality of objects and provides an object addressable interface via which at least some of the plurality of objects are accessible. An object accessible via the object addressable interface may be accessible via an object identifier and the object may include a plurality of fragments. The object addressable storage system may be implemented in a tiered storage environment comprising a plurality of storage tiers. The method may include, in response to a command provided to the object addressable interface to perform a storage operation on the object, for each of at least one fragment of the object: accessing metadata associated with the fragment; accessing a policy; and selecting a storage tier of the fragment based on the policy and the metadata associated with the at least one fragment.

Some embodiments are directed to a method of operating an object addressable storage system that stores a plurality of objects and provides an object addressable interface via which at least some of the plurality of objects are accessible. Objects accessible via the object addressable interface may be accessible via a respective object identifier and the objects may have metadata associated therewith. The object addressable storage system may be implemented in a tiered storage environment comprising a plurality of storage tiers. The method of operating the object addressable storage system may include generating a policy for performing a storage operation on at least one fragment of a stored object using the object addressable storage system, wherein generating the policy comprises receiving user input comprising: a first parameter specifying metadata criteria for metadata associated with the at least one fragment; and a second parameter specifying at least one capability of a target storage tier of the plurality of storage tiers. Generating the policy may also include storing in a data structure in computer-readable storage medium information specifying an association between a storage tier having the at least one capability and at least one object fragment associated with metadata meeting the metadata criteria.

Some embodiments are directed to at least one non-transitory computer-readable storage medium comprising computer-executable instructions that, when executed by at least one processor, perform a method of configuring an object addressable storage system that stores a plurality of objects and provides an object addressable interface via which at least some of the plurality of objects are accessible. Objects accessible via the object addressable interface may be accessible via a respective object identifier and the objects may have metadata associated therewith. The object addressable storage system may be implemented in a tiered storage environment comprising a plurality of storage tiers. The method may include generating a policy for performing a storage operation on at least one fragment of a stored object using the object addressable storage system, wherein generating the policy may include receiving user input comprising: a first parameter specifying metadata criteria for metadata associated with the at least one fragment; and a second parameter specifying at least one capability of a target storage tier of the plurality of storage tiers. Generating the policy may also include storing in a data structure information specifying an association between a storage tier having the at least one capability and at least one object fragment associated with metadata meeting the metadata criteria.

Some embodiments are directed to a system, comprising a computer-readable storage device and a computing device. The computing device may include an interface to an object addressable storage system that stores a plurality of objects and provides an object addressable interface via which at least some of the plurality of objects are accessible. Objects accessible via the object addressable interface may be accessible via a respective object identifier and the objects may have metadata associated therewith. The object addressable storage system may be implemented in a tiered storage environment comprising a plurality of storage tiers. The computing device may be configured for generating a policy for performing a storage operation on at least one fragment of a stored object using the object addressable storage system. Generating the policy may include receiving user input comprising: a first parameter specifying metadata criteria for metadata associated with the at least one fragment; and a second parameter specifying at least one capability of a target storage tier of the plurality of storage tiers. Generating the policy may also include storing in a data structure in the computer-readable storage device information specifying an association between a storage tier having the at least one capability and at least one object fragment associated with metadata meeting the metadata criteria.

The foregoing is a non-limiting summary of the invention, which is defined by the attached claims.

BRIEF DESCRIPTION OF THE DRAWINGS

Aspects of the invention are described with reference to illustrative embodiments and the following drawings in which like reference characters represent like elements, and wherein.

DETAILED DESCRIPTION

Figure 1:
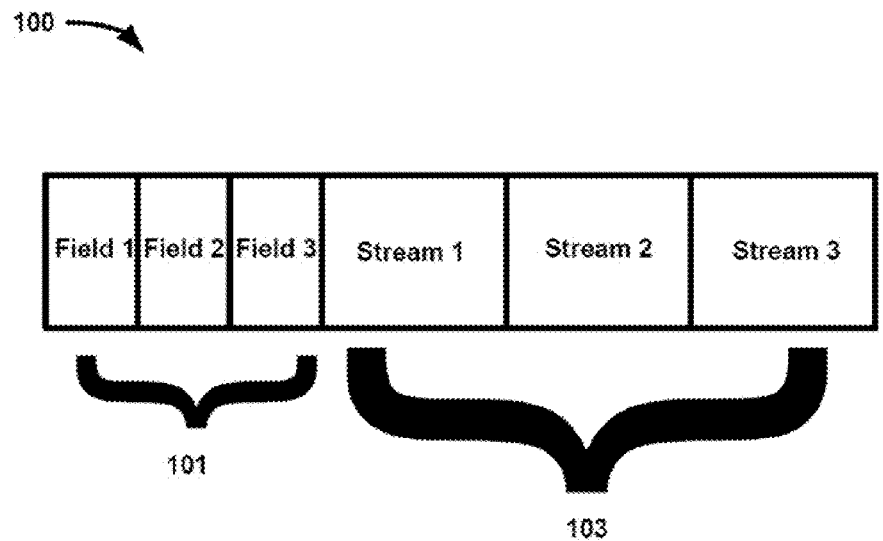
FIG. 1 is a diagram of an illustrative XSet that may be used in some embodiments.

In certain embodiments, configuring an interface to an object addressable storage system to manage storage of different portions of an object, referred to as fragments, in different tiers may improve overall utility of the storage system. In some embodiments, each tier may have a different set of storage capabilities. Some embodiments may include a fixed content tier, a transactional storage tier, a database storage tier or any other suitable tier of storage. In most embodiments, the fixed content tier may be implemented using a content addressable storage (CAS) system.

In at least some embodiments, the interface may manage storage of object fragments based on metadata associated with the fragments and a policy for the storage system. In some embodiments, managing storage of an object may include, upon writing the object, selecting a tier for one or more fragments and routing the fragments to storage devices implementing the selected tier for that fragment based on the policy. Some embodiments may also include, upon reading the object, accessing a tier for each fragment and assembling the object from data read from each of multiple tiers. In further embodiments, management of which tier is to be used for storing a fragment may occur transparently to an application or other component, such as an application programming interface, accessing the multi-tier object addressable storage (OAS) system.

In some embodiments, the policy may be stored in a computer data structure that may be accessed by one or more components within an object addressable storage system. Some embodiments utilize a policy file to hold such a data structure. The policy information may have any suitable form, but in some embodiments the data structure may store the policy as rules for determining in which tier a fragment should be stored.

The policy may be based on any suitable criteria to indicate, for any fragment, a tier in which the fragment is to be stored. However, in some embodiments the policy may be based on metadata associated with the fragment being stored. In embodiments in which the policy is specified as one or more rules, each rule may have a predicate portion indicating criteria on metadata for a fragment. In these embodiments, such a rule may also include information from which a tier of a multi-tier OAS system can be identified and used for storing the fragment when those metadata criteria are met.

In these embodiments, the information identifying the tier may be specified in any suitable way. In some embodiments, that information may indicate capabilities of a tier of the multi-tier OAS system. In other embodiments, a specific tier may be indicated or a particular storage device within a tier may be identified by name.

In some embodiments, the rules defining the policy may be hierarchical. In certain embodiments, the rules may be hierarchical in the sense that, if a fragment cannot be stored in accordance with a first rule in an hierarchy, storage may be made according to a rule lower in the hierarchy. In most embodiments, such a hierarchy may be implemented in any suitable way. In some embodiments, for example, if a first rule specifies a storage capability that is not available on one of the plurality of storage tiers, even if the predicate portion of the first rule is satisfied, a second rule may be applied to select a target tier. Some embodiments may also apply a default storage tier when no rule in the hierarchy applies to the fragment being operated on.

In some embodiments, any suitable computing device may create a policy by storing a plurality of rules that relate fragment metadata to storage capabilities of one or more of the plurality of storage tiers of the multi-tier OAS system. Different embodiments may create the aforementioned policy in any suitable way. In some embodiments, the policy may be created by a user of the multi-tier OAS system. Certain embodiments may utilize a graphical user interface (GUI) through which the user may input at least a first parameter specifying metadata criteria and a second parameter specifying at least one capability of a target storage tier. In some embodiments, the GUI may be implemented on any suitable computer and the policy may be communicated to the computer system that ultimately implements the policy via any suitable means, such as a network or a computer readable medium.

In at least some embodiments, a policy may be established based on any suitable factors, such as characteristics of the storage tiers and/or characteristics of objects stored in the system and/or characteristics of how the objects are likely to be used in an application. In particular embodiments, an object may be a document, such as a medical record that is accessed by a computer application program running on a hospital's computer. In some embodiments, the document may have different sections, which may be associated with the different fragments of the object. In certain embodiments, an application program may update a fragment frequently, such as a pulse rate or blood pressure of a patient that is being actively monitored. In some embodiments, an application program may simply write data that should never be altered or changed, such as an x-ray. Most embodiments of a multi-tier OAS system benefit from storing fragments that are static in a different tier than fragments that are updated frequently. For example, in some embodiments, a frequently updated fragment may be stored on a transactional storage system whereas a static fragment may be stored on a fixed content storage system. Moreover, in some embodiments, there are additional parameters, other than the frequency at which the data of a given fragment is updated, that may be used to determine what type of storage tier should hold a particular fragment. For example, some embodiments may utilize a storage tier capable of using compression to store data such as x-ray images or any other image and video files.

In some embodiments, the policy used to select a target storage tier for fragments of the object may be applied at any suitable location or locations within the storage system. Accordingly, in certain embodiments, policies for selecting a storage tier may be applied on any suitable device of the OAS environment. In various embodiments, the policy for selecting a storage tier may be applied on a host computer, on a switch of the network, or on an OAS controller, for example. Other embodiments may apply the policy on more than one device in the OAS environment. For example, some embodiments may implement a tier selection policy at the host computer that determines which of a plurality of OAS controllers to send storage operation commands and the receiving OAS controller may implement an additional policy to determine which of a plurality of storage devices should service the received command.

Some embodiments described in the present application are directed to use of the XAM standard. Other embodiments may not use the XAM standard. Some embodiments relate to techniques for storing content that may have both mutable and immutable fragments (e.g., an XSet with some non-binding stream or fields and some binding streams or fields) across multiple storage tiers, and may include a tier implemented on a fixed content storage system and a tier implemented on a transactional storage system. In some embodiments, a fixed content storage system may refer to a storage system that does not allow content stored thereon to be modified, unless a command to delete the content is received. In some embodiments, if a request to modify a content unit stored on a fixed content storage system is received, the fixed content storage system may create a new content unit, rather than overwrite the content of the previous version of the content unit with the modified content. In most embodiments, each time the content unit is modified, a new version of the content unit may be created on the fixed content storage system. In some embodiments, if it is desired to recover content from a content unit that was modified, a previous version of the content unit having the desired data may be retrieved. In certain embodiments, a fixed content storage system may be a CAS system.

Certain embodiments described herein may refer to fixed content storage systems that may be capable of implementing at least some aspects of the XAM standard. However, it should be appreciated that other embodiments may not use the XAM standard and may be used with any fixed content storage system.

In some embodiments, when a logical object is stored on a fixed content storage system, some or all of the content of the object (e.g., fields or streams of an XSet in XAM) may be non-binding, thereby allowing the XSet to be modified after it is stored on the fixed content storage system. In most embodiments, each time one of these non-binding fields is modified a new version of the object (e.g., the XSet) may be created. As a result, in most embodiments, if an object (e.g., an XSet) is modified frequently, a large number of versions of the object may be stored on the fixed content storage system, thereby consuming a large amount of storage space. In some embodiments, the problem may be compounded when there are a large number of objects with non-binding fragments that are being modified frequently.

In some embodiments, content is modified frequently until it is in a final state, after which it is desired that the content may no longer be able to be modified. In certain embodiments, it may be desirable to initially designate one or more streams of an XSet as non-binding as the content of the streams is periodically being modified, but then designate the stream as binding once the content is in a desired final state. In some embodiments, other streams of an XSet may be set as binding from the beginning if it is unlikely to be changed. In certain embodiments, content that changes frequently may arise if a user is monitoring a real-time data feed, such as the aforementioned pulse monitoring of a patient in a hospital. In most embodiments, frequent modification to fragments of the content may occur as the patient is monitored, but once the patient is discharged, that particular fragment may not be modified again. In certain embodiments, other portions of the document, such as x-rays, may be static the entire time. In some embodiments, while fixed content storage systems may be advantageous for storing content that is fixed (e.g. fix content storage systems may do so cost effectively), transactional storage systems may be better suited for storing content that changes frequently. In most embodiments, a transactional storage system may be a storage system in which content may be modified by overwriting or deleting a fragment of the content, rather than creating a new version to store the modified content.

In some embodiments, for many real-life scenarios, objects may contain fragments that are frequently updated and fragments that are rarely modified. In certain embodiments, it may be desirable to store the fragments of the object that are likely to be modified on a transactional storage system and store the rarely modified fragments of the object on a fixed content storage system. Moreover, in some embodiments, other properties of the fragments may be used to determine which storage tier should be used for storing a fragment. For example, in some embodiments, specific file types may benefit from being stored on a storage tier with a particular capability. Some of these embodiments may store fragments with an image file type, such as JPEG, RAW, or BMP, in a storage tier capable of using compression. Other embodiments may use parameters such as the location of the application program invoking the storage operation and the time of the storage operation to determine a target storage tier for a fragment. As another example, in some embodiments a time of last access or last modification may be used to determine on which storage tier the fragment should be stored.

In some embodiments, these and/or other parameters may be used in defining a policy for selecting a storage tier for one or more fragments.

Accordingly, some embodiments may relate to storing an object with a plurality of fragments in a tiered storage system comprising more than one type of storage. In certain embodiments, the type or other characteristics of storage used for each fragment of an object may be automatically determined by application of a policy such that where the fragment is physically stored is determined automatically by the storage system without the user or application program needing to specify, at the time of invoking the storage operation, where the fragment should be stored. Some embodiments may relate to configuring and/or providing a storage policy that controls storage of object fragments between a plurality of storage tiers, each with its own set of capabilities and features. For example, in some embodiments, a first storage tier may utilize a transactional storage system (in which content may be readily modified) and a second storage tier may utilize a fixed content storage system (in which content is efficiently stored in an unchanged manner).

In at least some embodiments, the format of objects stored in the object addressable storage system may not be not critical to the invention. However, in some embodiments, the object may be a XAM XSet that is stored in a tiered storage system comprising a transactional storage system and a content addressable storage (CAS) system. In some embodiments, content units may be logical objects used to store content on a CAS system and are identified and accessed using content addresses. In many embodiments, a content address may be an identifier that is computed, at least in part, from at least a portion of the content (which may be data and/or metadata) of its corresponding unit of content. In some embodiments, a content address for a unit of content may be computed by hashing the unit of content and using the resulting hash value as at least a portion of the content address.

In some embodiments, an object addressable storage (OAS) system may receive commands to perform storage operations on objects to be stored or already stored on the OAS system. In most embodiments, any suitable command may be received. In certain embodiments, a command may be a write command, a read command, or a command to modify the contents of one or more fragments of the object. In most embodiments, each fragment of an object may be stored in a respective tier of the multi-tier OAS system.

In some embodiments, the tier selected for a particular fragment of the object may be selected based on metadata associated with the fragment. In certain embodiments, the metadata may be provided to the OAS system by an application program, or any other entity, that accesses the OAS system to store or retrieve an object. Alternatively or additionally, in some embodiments, the metadata may be generated, updated or otherwise maintained by the storage system. In some embodiments, any suitable metadata may be used. In certain embodiments, the metadata may be a name-value pair associated with the fragment. In some embodiments, the metadata for a fragment may be stored in a different fragment of the object, such as a field 101 associated with a stream 103 of content in an XSet, as illustrated in FIG. 1.

In some embodiments, a rule from a policy for determining a storage tier will, when evaluated, use the metadata associated with the object fragment being operating upon to determine a target storage tier to perform the storage operation. The target storage tier may be specified in any suitable way. In some embodiments, the rule may specify one or more capabilities that a storage tier for a fragment with a particular type of metadata should have when selecting a target storage tier. Some embodiments may utilize hierarchical rules such that if a preferred storage tier is unavailable for fragments with particular associated metadata, a secondary storage tier is specified. For example, in some embodiments where an x-ray image fragment is being stored, a rule may specify a preferred storage tier as having the capability of storing fragments in a compressed form. If, in these embodiments, a storage tier with compression capabilities is unavailable or has no available storage space, the rule may specify a secondary storage tier with fixed content storage capabilities as the target storage tier.

Embodiments may not specify a capability associated with a storage tier. Some embodiments may use rules that specify a geographical location, storage domain, name or any other suitable property that a target storage tier for a fragment associated with particular metadata should have.

In some embodiments, more than two tiers may be used. In most embodiments, the tiers may be implements on any suitable type of storage. In certain embodiments, for example, there may be a tier implemented with a network attached storage (NAS) system, a database storage system, a flash memory storage system, a block storage system, a content addressable storage system, a redundant array of independent disks (RAID) storage system, a CD/DVD storage system, a magnetic tape storage system and/or a server storage system. In some embodiments, each type of storage system may be selected to store a fragment stored in the OAS system based on the capabilities of each type of storage. In some embodiments, a NAS system is relatively quick, but may not provide as much protection against loss as a RAID storage system. In most embodiments, portions of the object that require extra protection against loss may be stored on RAID tier of the OAS system. Accordingly, in some embodiments, a policy may specify a target storage tier based on any suitable characteristics of a storage system on which to store an object fragment.

Figure 2:
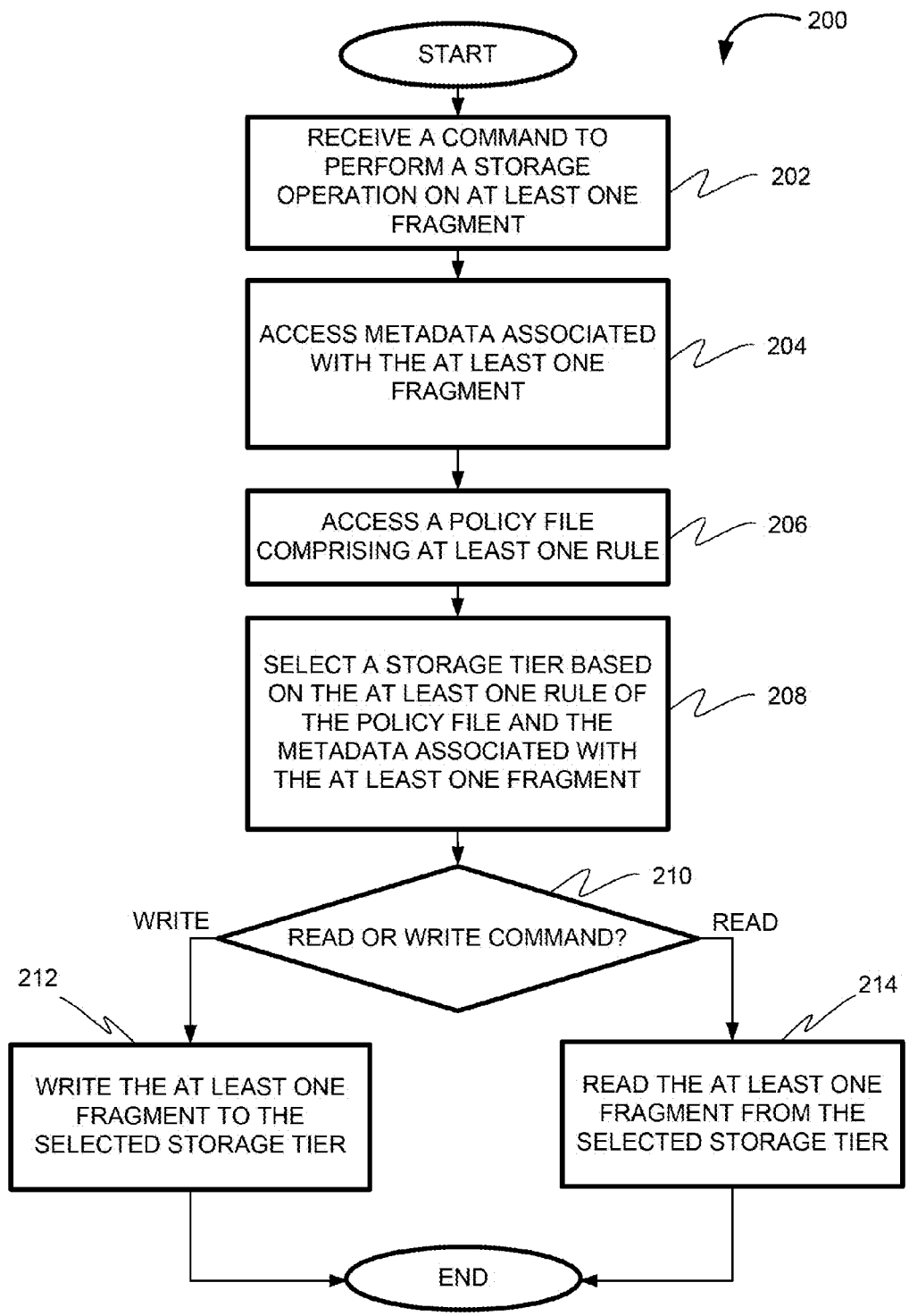
FIG. 2 is a flow chart of an illustrative process for performing a policy-based storage operation on a multi-tier OAS system, in accordance with some embodiments.

In some embodiments, such a policy may be applied as part of a storage operation regardless of how a policy is specified or where within a storage system it is applied. FIG. 2 illustrates an exemplary process 200 for performing a policy-based storage operation on a multi-tier OAS system in an embodiment in which a policy is stored as a policy file containing rules having predicates defined based on metadata for one or more fragments of an object defined in accordance with the XAM standard.

At act 202 a command to perform a storage operation on at least one fragment is received. At act 204, metadata associated with the at least one fragment is accessed. At act 206 a policy file is accessed. The policy file comprises at least one rule. At act 208, the at least one rule is executed to select a storage tier. The selection of a storage tier is based, at least in part, on metadata associated with the at least one fragment. At act 210, it is determined what kind of storage operation the command is implementing. If it is determined that the command was a write command, then the at least one fragment is written to the selected storage tier at act 212. If the command is determined to be a read command, then the at least one fragment is read from the selected storage tier.

FIG. 2 illustrates one embodiment of process 200. Other embodiments may differ in their implementation. For example, the acts described in FIG. 2 may be implemented by any suitable device of the OAS environment, as will be discussed in more detail in connection with FIGS. 4-6.

Figure 3:
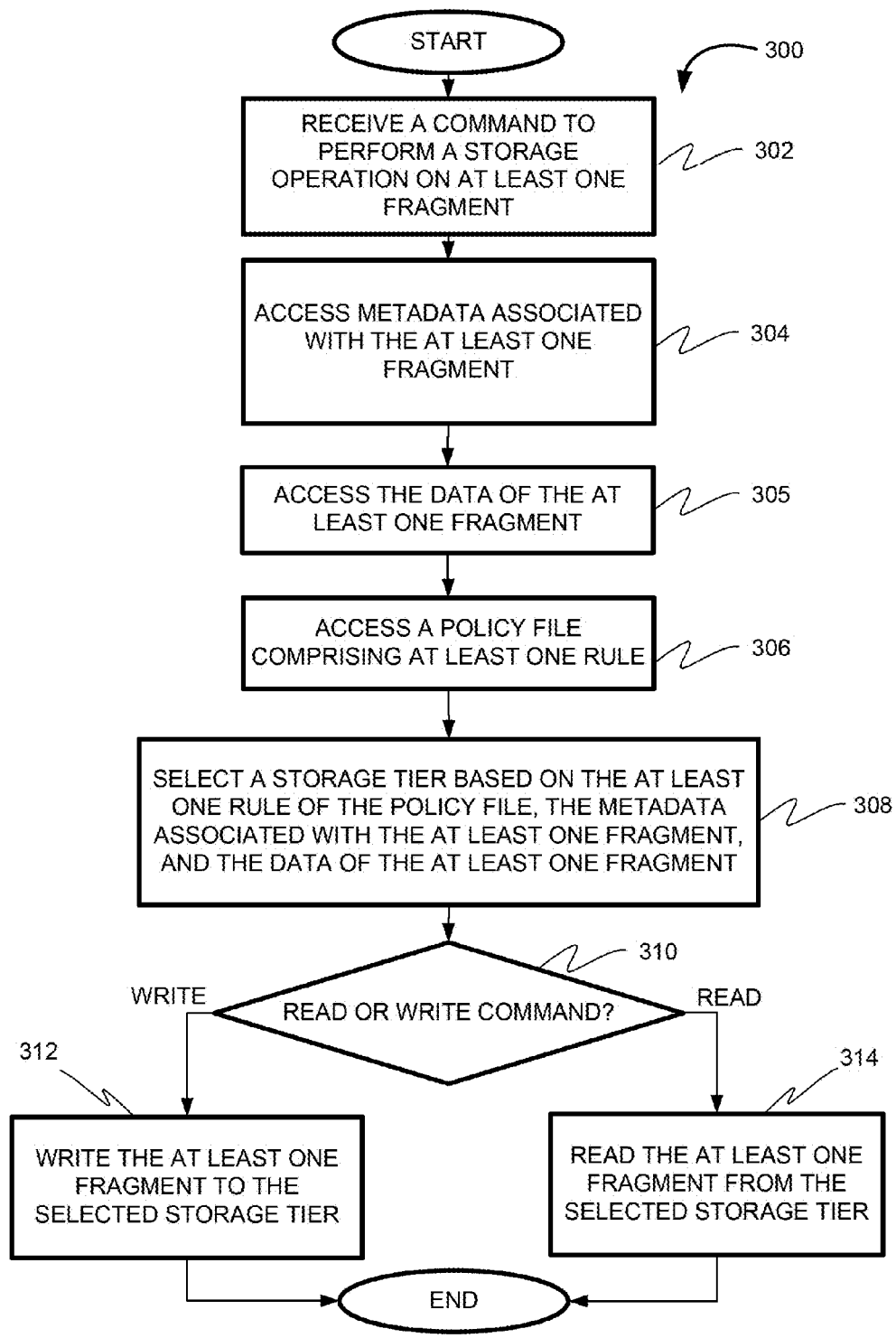
FIG. 3 is a flow chart of an illustrative process for performing a policy-based storage operation on a multi-tier OAS system, in accordance with some embodiments.

FIG. 3 illustrates an exemplary process 300 for performing a policy-based storage operation on a multi-tier OAS system. Acts 302, 304, 306, 310, 312 and 314 of process 300 are similar to the acts 202, 204, 206, 210, 212 and 214 described in connection with FIG. 2, respectively, and a detailed description of these acts will not be repeated. In process 300, the data of the fragment itself is accessed at act 305. The fragment data is used by the rule to select the target storage tier in act 308. By accessing the data of the fragment itself and using that to make a storage tier selection, a broad range of rules may be implemented.

FIGS. 2-3 illustrate two embodiments of a process that may be implemented on a multi-tier OAS system. Particular scenarios showing how these processes may be implemented are now described. For example, at act 202, a command may be received in any suitable way. In some embodiments, the command may be received from a network interface connected to a communication network. As another example, in other embodiments, it may be received from an application program interface (API) executing on the same computing device that executes process 200 or 300.

Embodiments may also access the metadata, as in act 304, in any suitable way. For example, in some embodiments, the metadata may be stored in a XSet field associated with an XSet stream and the metadata may be accessed by retrieving the data from that XSet field. Some embodiments may store metadata in a storage system optimized for responding to frequent queries and requests for information, such as a database storage system. An example embodiment may utilize may use a relational database, such as an Oracle database.

Some embodiments may use the data of the at least one fragment to select a storage tier in any suitable way. For example, in some embodiments, a rule may specify that any fragment containing a specific text string should be stored in a particular storage tier. By way of example, if the object is a medical record, a rule may specify that a fragment containing a particular doctor's name be stored on a storage tier geographically located near the hospital where said doctor practices. In these embodiments, fragments of the medical record relevant to the doctor may be stored geographically close to the doctor.

Figure 4:
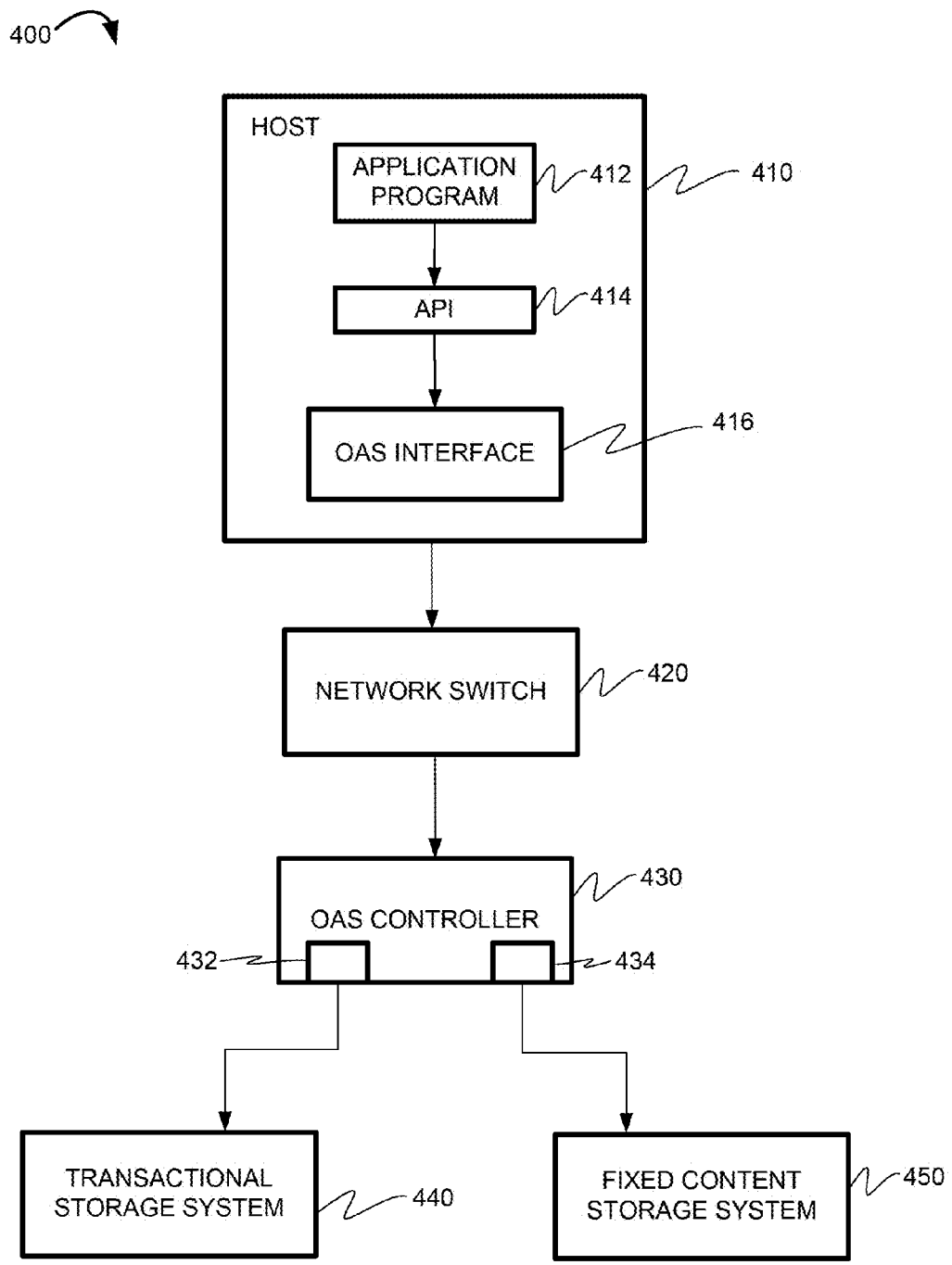
FIG. 4 is a block diagram of an illustrative multi-tier OAS system, in accordance with some embodiments.

FIG. 4 illustrates an embodiment of the multi-tier OAS system 400. A host computer 410 is a computing device that executes an application program 412 that stores, reads and modifies data stored on the OAS system 400. To interface with the OAS system, the application program 412, which is unaware of the details of the underlying OAS system, may access the OAS system through an application program interface (API). The API 414 converts the storage operation command from the application program 412 into an OAS storage operation command and sends the OAS command to the OAS interface 416. In the illustrated embodiment, the OAS interface 416 selects a storage tier for the fragment using at least one rule of a policy. The rule or rules of the policy relate metadata associated with the fragment being operated on to information that allows a tier to be identified. In the illustrated embodiment, that information represents the capabilities and characteristics of the storage tiers of the multi-tier OAS system.

The host application 410 communicates the OAS command to a network switch 420 in a communication packet. The network switch 420 determines, based on the packet containing the OAS command, the destination device of the command and forwards the packet to the destination OAS controller 430. The OAS 430 controls the interaction between the host 410 and the storage systems 440 and 450. The OAS controller 430 communicates with the transactional storage system 440 and the fixed-content storage system 450 via drivers 432 and 434, respectively. Each respective driver converts the OAS command into a storage operation command understandable by the respective storage system. The transactional storage system 440 stores fragments in a manner such that frequent modifications of fragments stored thereon do not overburden the transactional storage system, as described above. The fixed content storage system 450 stores content that is static in a manner such that data is retained without deletion, as described above.

FIG. 4 illustrates an embodiment of a multi-tier storage system 400. Other embodiments may differ in their implementation. For example, in some embodiments, there may be a plurality of host computers, each with an OAS interface for selecting a target storage tier. Moreover, some embodiments may also include a plurality of network switches. In these embodiments, which switch of the plurality of switches receives a command from a particular host computer may be determined based on the policy for selecting a target storage tier. As an example of other variations, some embodiments of a multi-tier storage system may not have a network switch 420 and the host computer 410 may communicate directly with OAS controller 430. In further embodiments, there may be more than two storage tiers from which the policy selects and each storage tier may have a plurality of characteristics and capabilities which the policy may use in selecting a target storage tier.

In some embodiments, the OAS interface 416 may be integrated into the API 414, such that they are a single interface. In other embodiments, the OAS interface may be a plug-in, which may be installed on any computing device of the OAS storage system. In this way, some embodiments an OAS interface may be implemented on a computing device of the multi-tier OAS system other than, or in addition to, the host computer 410.

Figure 5:
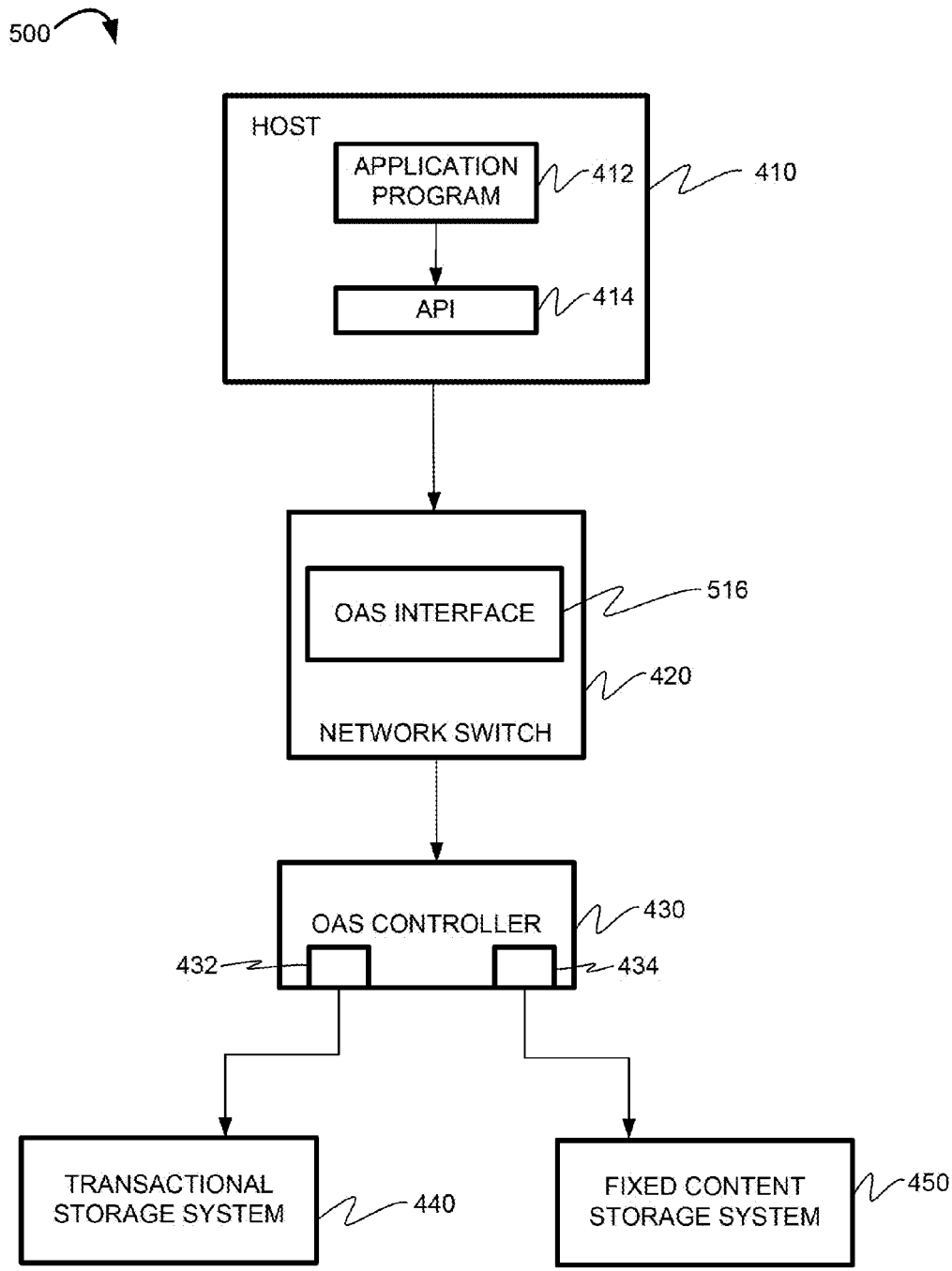
FIG. 5 is a block diagram of an illustrative multi-tier OAS system, in accordance with some embodiments.

FIG. 5 illustrates an embodiment of a multi-tier OAS system 500 where, instead of the host computer 410 implementing the OAS interface 416, the network switch 420 implements an OAS interface 516. In the illustrated embodiment, many of the devices of system 500 are similar to the devices described in connection with FIG. 4. These devices are given identical reference characters and a detailed description of these devices will not be repeated. The OAS interface 516 may select a target storage tier in a similar manner as OAS interface 416. However, in the illustrated embodiment, a different set of rules is applied at the OAS interface 516 than would be applied at OAS interface 416.

FIG. 5 illustrates one embodiment of a multi-tier storage system 500. Other embodiments may differ in their implementation. For example, an OAS interface may be implemented on the host computer 410. In this embodiment, a storage tier selection made by OAS interface 410 may determine which of a plurality of network switches to send the storage operation command to and the OAS interface 516 of the selected network switch makes an additional storage tier selection to determine which OAS controller of a plurality of OAS controllers should receive the storage operation command. In some embodiments, the rules may be obtained from a policy file or any other suitable data structure in any suitable computer-readable medium.

Figure 6:
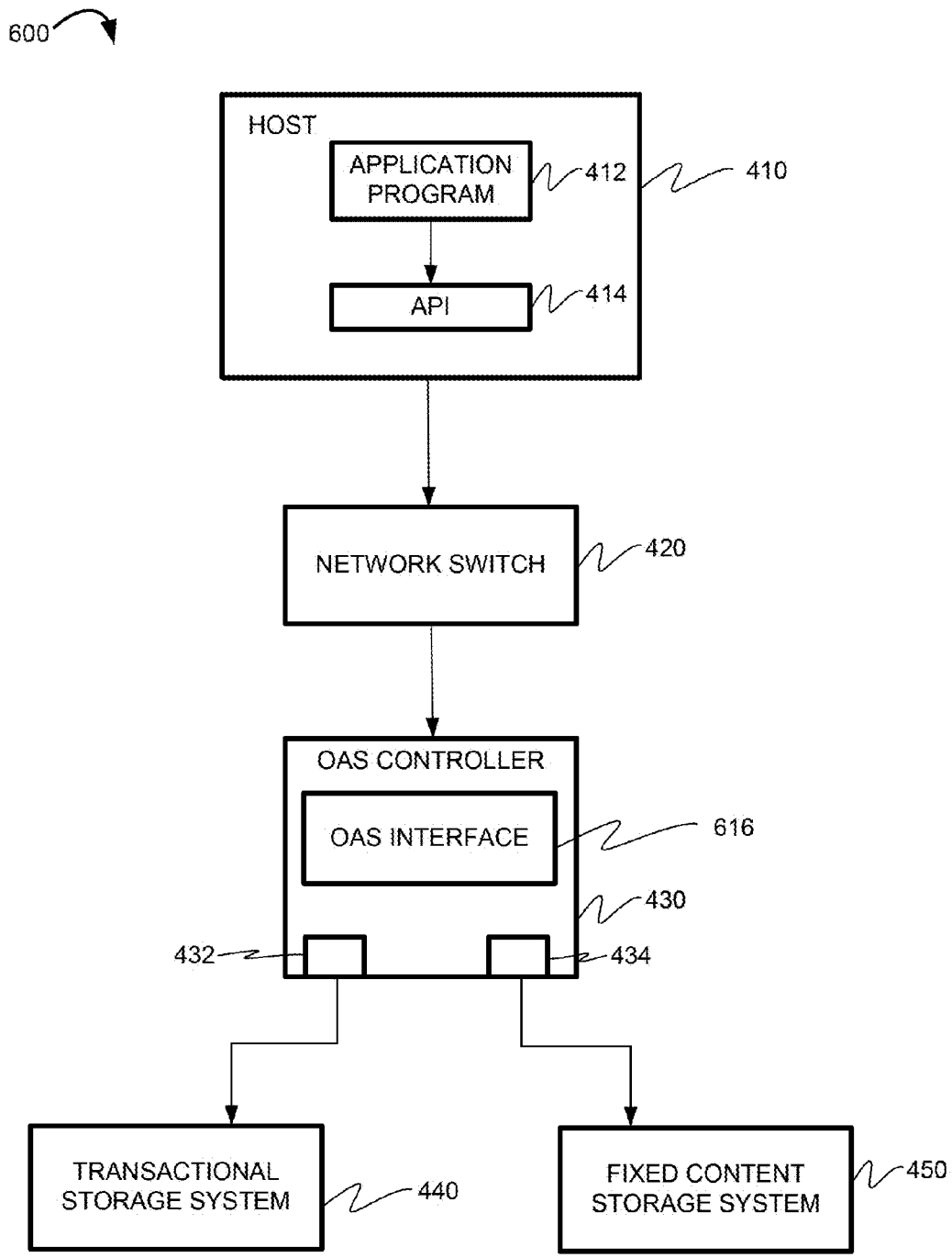
FIG. 6 is a block diagram of an illustrative multi-tier OAS system, in accordance with some embodiments.

FIG. 6 illustrates an embodiment of a multi-tier OAS system 600 where, instead of the host computer 410 or network switch 420 implementing the OAS interface 416 or OAS interface 516, the OAS controller 430 implements an OAS interface 616. Many of the devices of system 600 are similar to the devices described in connection with FIG. 4. These devices are given identical reference characters and a detailed description of these devices will not be repeated. The OAS interface 616 selects a target storage tier in a similar manner as OAS interface 416 and OAS interface 516. A different set of rules is applied at the OAS interface 616 than would be applied at either of the FIG. 6 illustrates one embodiment of a multi-tier storage system 600. Other embodiments may differ in their implementation. For example, OAS interface 416 and OAS interface 516 may be implemented on the host computer 410 and the network switch 420, respectively. In this embodiment, a storage tier selection made by OAS interface 410 may determine which of a plurality of network switches to send the storage operation command to, the OAS interface 516 of the selected network switch may make an additional storage tier selection to determine which OAS controller of a plurality of OAS controllers should receive the storage operation command, and the OAS interface 616 may make an additional storage tier selection to determine which storage device of a plurality of storage devices is the target storage device for the storage operation command. In embodiments such as these, implementing the storage tier selection at all layers of the multi-tier OAS system may allow for more complicated policies with greater, more efficient control of fragment storage.

In some embodiments in which the OAS interface is distributed across multiple components the portions of the OAS interface executing on each component may access policy information from the same source, such as the same policy file. In other embodiments, each portions of the OAS interface may access a separate policy file or other data store containing policy information, In most embodiments, regardless of where in the system a policy is applied, policy information may be acquired in any suitable way. In some embodiments, policy information may be acquired by receiving and storing policy information from a user, which may be pa user of any suitable portion of the storage system. For example, in some embodiments, the user may be an end user of an application. In other embodiments, the user may be a user of the storage system, such as an administrator. Moreover, though a user is described, in some embodiments, the user is not a single person or other entity, but a collection of people or other entities, such as multiple end users or multiple administrators. In embodiments in which multiple entities supply policy information, the policy information may be arranged hierarchically based on privileges or other criteria associated with the entities providing the information.

Figure 7:
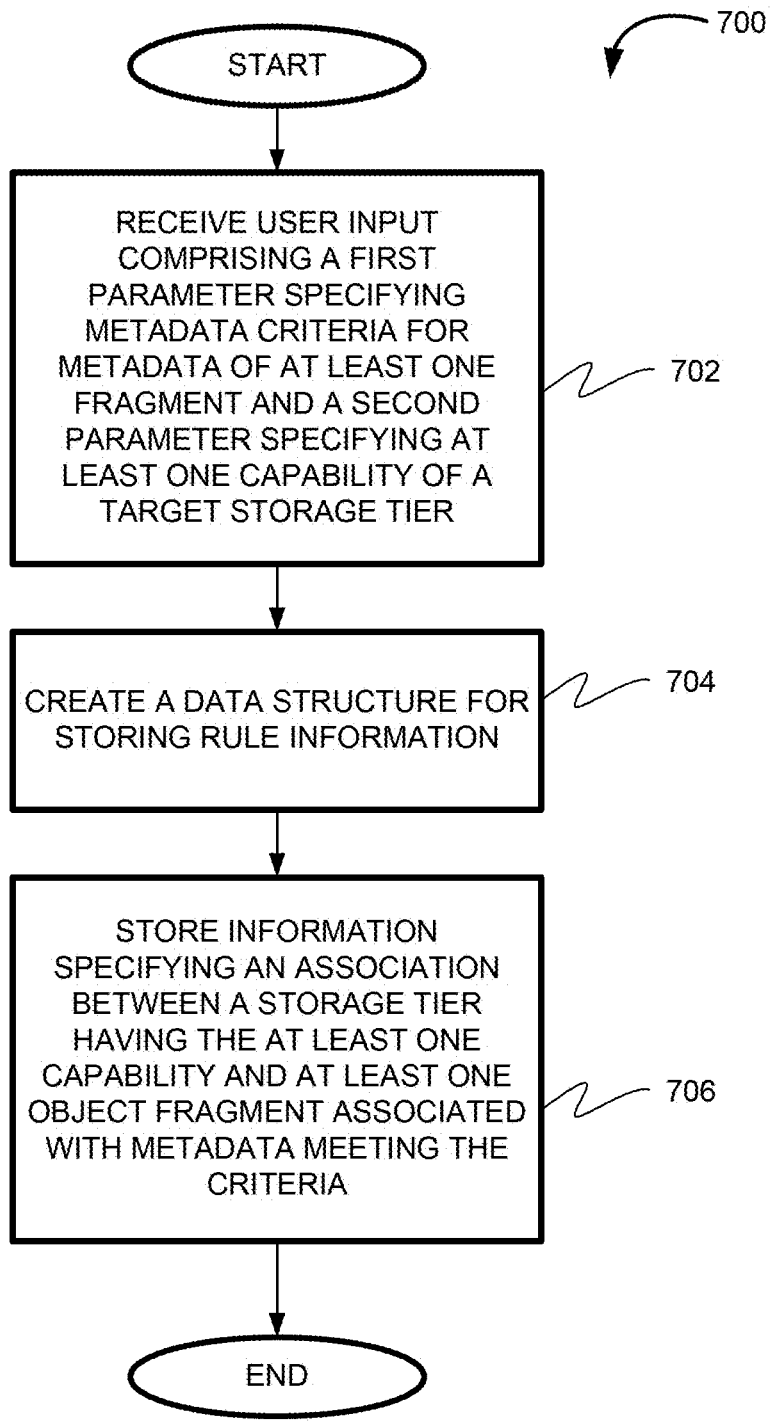
FIG. 7 is a flow chart of an illustrative process for generating a policy for use in a multi-tier OAS system, in accordance with some embodiments.

FIG. 7 illustrates an embodiment of a process 700 for generating a policy for use by an OAS interface of a multi-tier OAS system. The process 700 is implemented on any suitable computing device, which in some embodiments may be a component of the OAS system or, in other embodiments may be a separate computing device. At act 702, the computing device implementing process 700 receives user input comprising at least a first parameter and a second parameter. The first parameter specifies metadata criteria for metadata associated with at least on object fragment. The second parameter provides information from which a storage tier may be identified. In this example, the second parameter specifies at least one capability of a target storage tier of the plurality of storage tiers of the multi-tier OAS system. The at least two parameters received by the computing device are received via a graphical user interface (GUI), as described in connection with FIG. 8A-C below.

At act 704, a data structure is created for storing rule information. In this embodiment, the data structure is a policy file that stores information for implementing one or more rules. At act 706, information specifying an association between a storage tier having the at least one capability specified by the second parameter and the at least one fragment associated with metadata meeting the metadata criteria specified by the first parameter.

FIG. 7 illustrates one embodiment of policy generation process 700. Other embodiments may differ in their implementation. For example, some embodiments may receive more than two parameters from the user input. In some embodiments, a third parameter may be received that may specify a second metadata criteria of metadata associated with the stored object. In these embodiments, a rule may be stored in the data structure that associates a storage tier with object fragments associated with metadata meeting the second metadata criteria.

In some embodiments, the act of creating a data structure may be omitted. For example, in some embodiments, the data structure may already exist and the information pertaining to a new rule received from the user input may be added to the existing data structure.

Figure 8A:
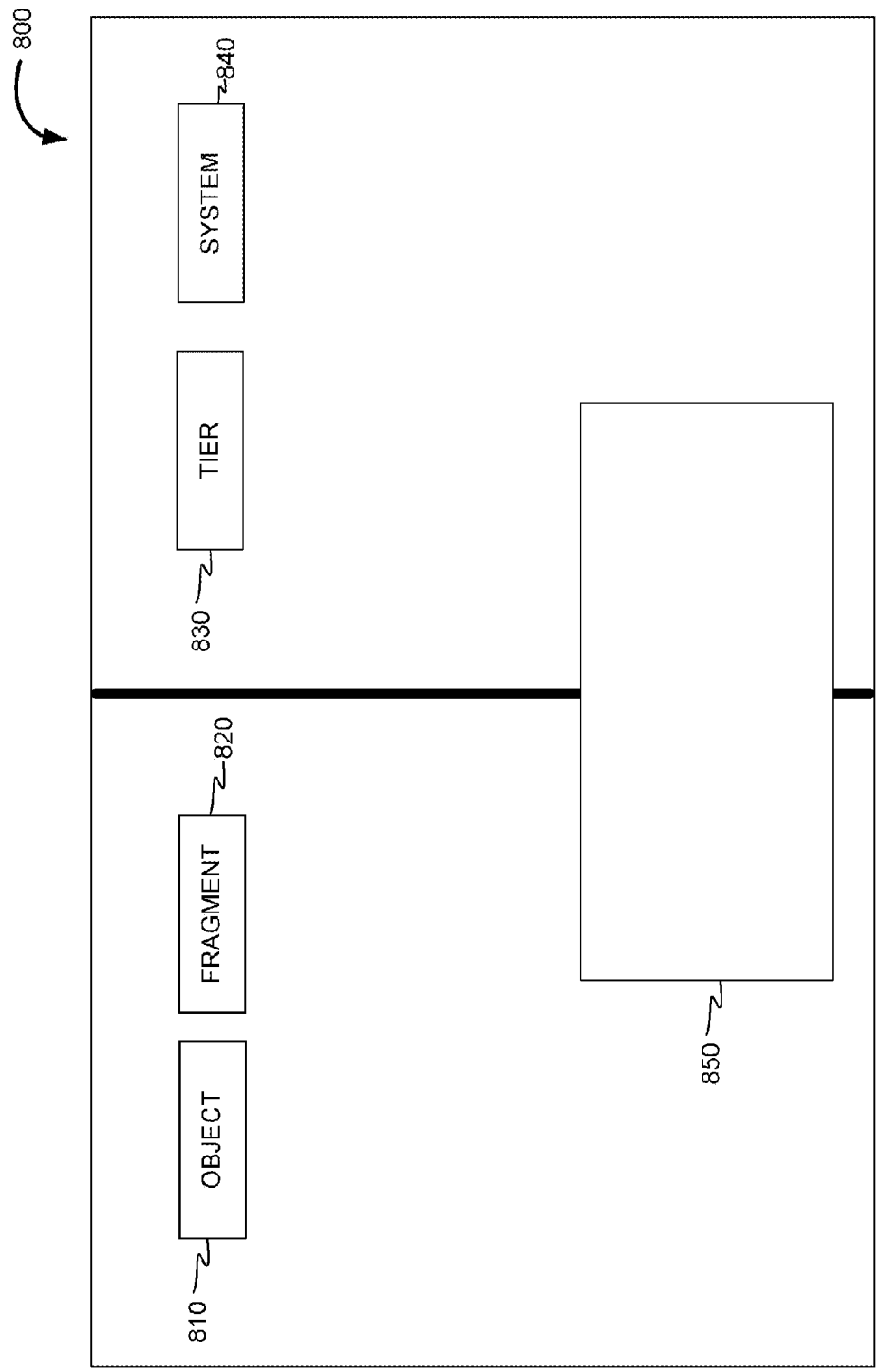
FIG. 8A is an exemplary graphical user interface (GUI) used to generate a policy for use in a multi-tier OAS system, in accordance with some embodiments.
Figure 8B:
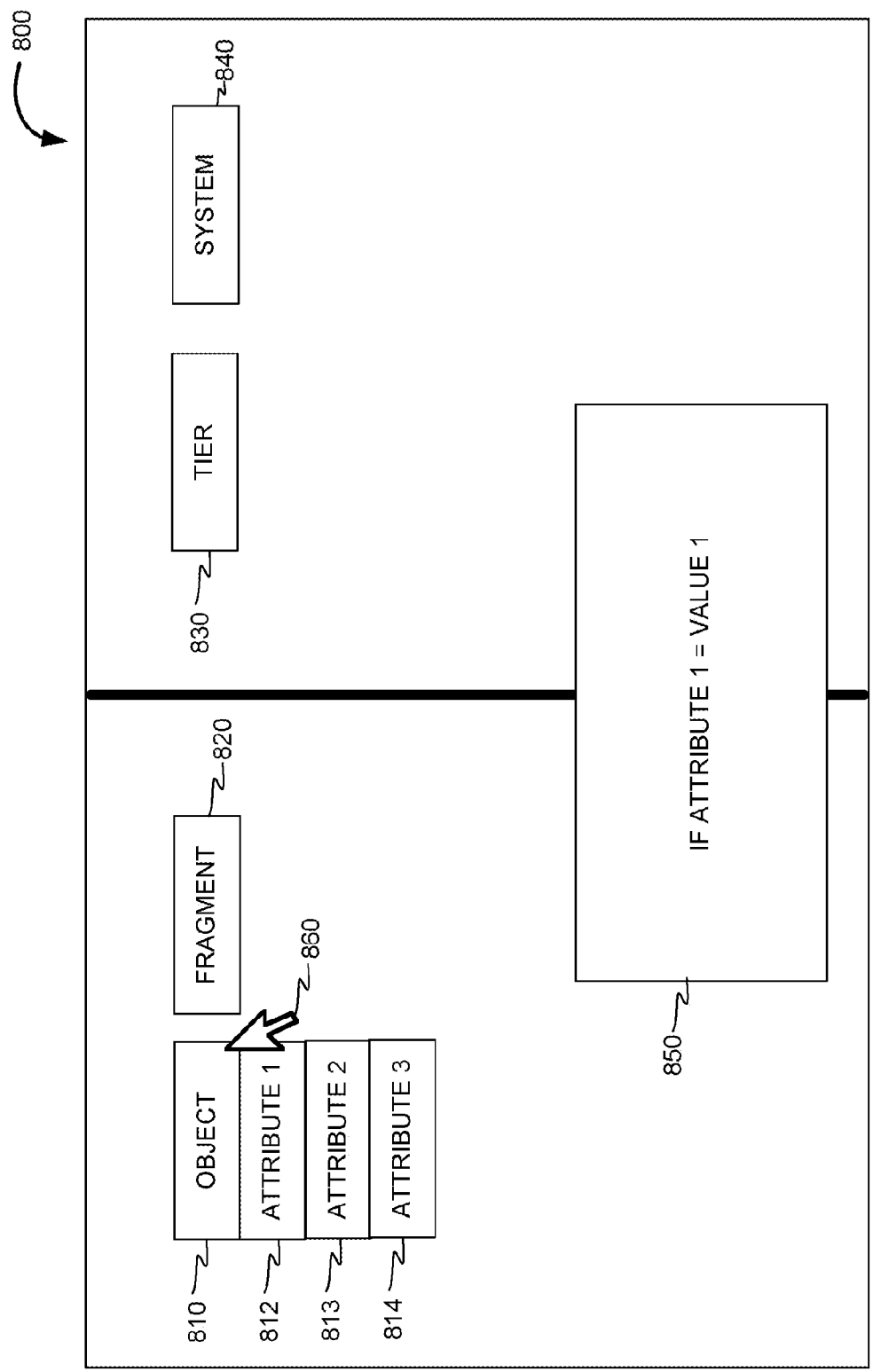
FIG. 8B illustrates a first act of generating a policy wherein the GUI is used to select a fragment attribute, in accordance with some embodiments.
Figure 8C:
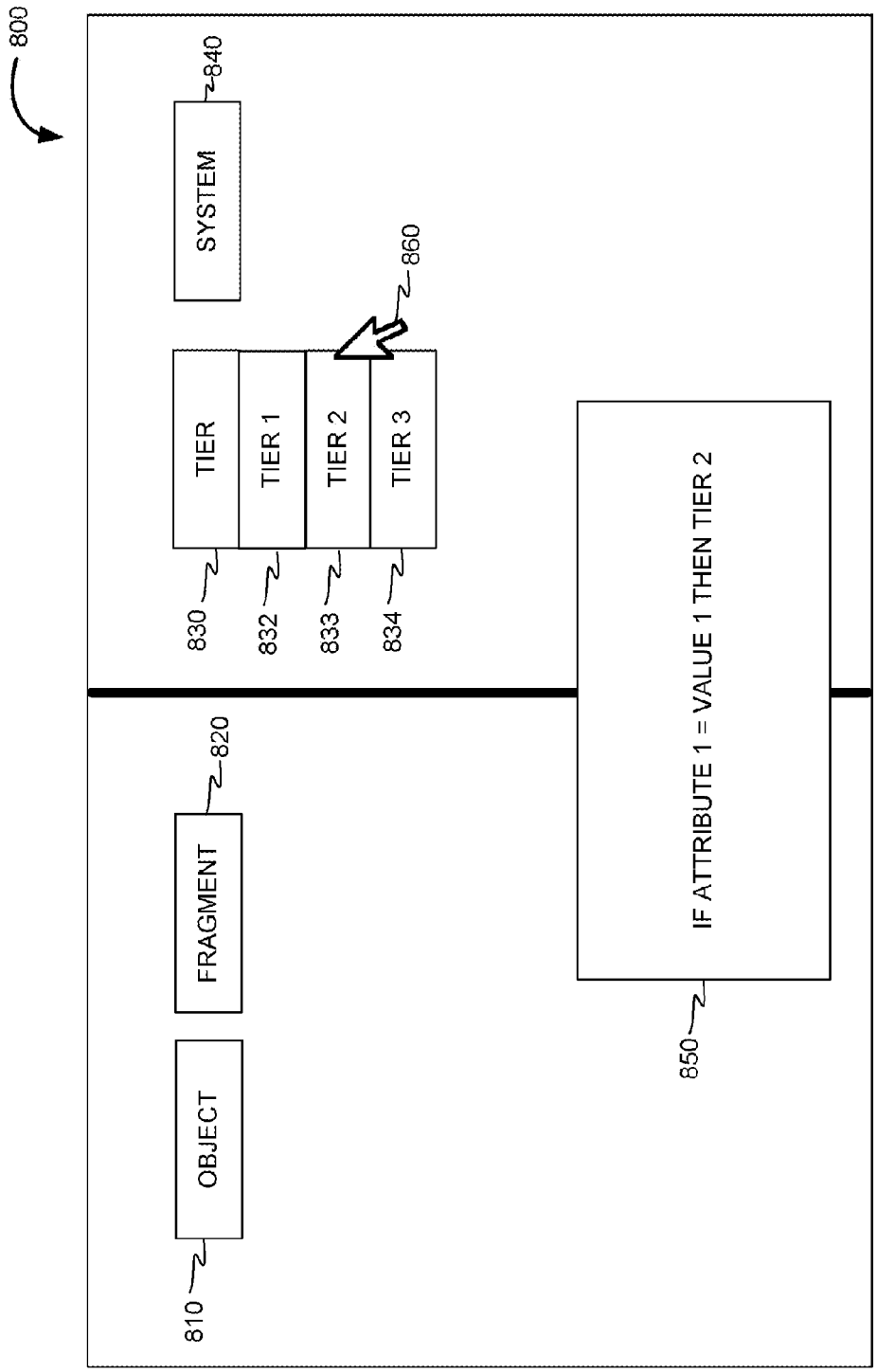
FIG. 8C illustrates a second act of generating a policy wherein the GUI is used to select a target storage tier, in accordance with some embodiments.

FIGS. 8A-C illustrate a GUI 800 of an embodiment in successive states as a user selects parameters for generating a rule for selecting a storage tier. In the illustrated embodiment, the left side of FIG. 8A illustrates menus 810 and 820 for selecting parameters associated with metadata associated with an object fragment. In this example, menu 810 allows a user to select parameters associated with an object, such that the parameters are associated with all fragments of the object. Menu 820 allows the user to select parameters associated with a specific fragment. The right side of FIG. 8B illustrates menus 830 and 840 for explicitly selecting one or a plurality of storage tiers. Menu 830 allows a user to select parameters of a tier. Menu 840 allows a user to select parameters of a storage system within a tier, such that a tier is indirectly specified. The display window 850 displays information related to the selections the user makes in the form of a human readable rule.

In the illustrated embodiment, the graphical user interface is populated with information about the storage system and attributes of objects to be stored. This information may be acquired in any suitable way. For example, a topology of a storage system may be programmed into the GUI in advance. Regardless of how this information is obtained, it may be used to populate menu choices offered to a user. These menu choices may allow a user to specify a predicate portion of a rule and a result when the criteria specified in the predicate portion are met.

FIG. 8B is an example of selection of a predicate portion of a rule. FIG. 8B illustrates the user operating an input device, such as a mouse or a track pad, to control a pointer 860 to select the object menu 810. When the object menu 810 is selected, a plurality of attributes 812-814 of an object are displayed, from which the user may select a particular attribute. In the illustrated example, the user selects "Attribute 1" 812 and then enters a value, "Value 1," using an input device, such as a keyboard or touchscreen. The display window 850, after the selection, displays the partial rule "If Attribute 1=Value 1," which will be completed after the user selects the parameters related to the desired storage tier.

The attributes displayed in display window 850 when the object menu in FIG. 8B is selected are the name portion of a name-value pair. A name-value pair is a structure for storing data, such as the metadata associated with an object, in a computing system. The user specifies the particular name, or attribute, and then chooses a value for said attribute.

FIG. 8C is an example of selection of a result portion of a rule. FIG. 8C illustrates the user operating the input device to control the pointer 860 to select the tier menu 830. When the tier menu 830 is selected, the plurality of tiers 832-834 are displayed, from which the user may select a target tier. The user, in this scenario, selects "Tier 2" 833. The display window 850, after the selection, displays the completed rule "If Attribute 1=Value 1 Then Tier 2" which indicates that when a fragment to be stored is associated with an object with metadata that indicates that "Attribute 1=Value 1," then the target storage tier for that particular fragment is "Tier 2."

The menus in FIGS. 8A-C are used to specify a predicate and result of rules using various parameters of the object fragments and various parameters of the storage system tiers. For example, selection of the fragment menu results in the display of a drop-down menu of name-value pairs associated with a specific fragment. This allows the user to select metadata values associated with a particular fragment, not the object as a whole. Likewise, selection of the system menu results in display of attributes of one or more storage systems that make up the OAS system.

FIGS. 8A-C illustrate one embodiment of generating a policy rule using GUI 800. Other embodiments may differ in their implementation. In some embodiments, through selection of system menu 840, rather than selecting a specific tier using tier menu 830, the user may select one or more characteristics associated with the plurality of systems that implement the storage tiers using the system menu 840. In some embodiments, the storage systems have metadata associated with the storage devices, such as name-value pairs. Some embodiments may use this metadata to create a rule. By way of example, in some embodiments an attribute of a system may be its geographical location. In these embodiments, the user may select "Location=Boston," to direct fragments of a matching a selected criteria to a storage device geographically located in Boston. In other example embodiments, the each storage system may be given a name which a user may user to create a rule. In these embodiments, for example, a user may indicate that all fragments with data that is video data should be stored to the system with the name-value pair "Name=Video Surveillance," which is the name of the system designated to store the video surveillance data for the use.

In some embodiments, through manipulation of these menus, a user may specify one or more rules of any desired complexity. The predicates, for example, may contain combinations of name value pairs, joined by logical operators such as AND, OR and NOT. In some embodiments, the results may specify characteristics of a desired storage tier, which may include a name of a storage system or storage tier.

In other embodiments, the GUI may contain information about the storage tiers or storage systems from which the user may select the result portion of a rule, but no menus about objects. In such embodiments, a user may enter the predicate portion of the rule in other ways, such as freeform text. As an example of another possible variation, some embodiments may display different or additional menus or other input mechanisms by which a user can specify either the predicate or result portion of the rule. In some embodiments, for example, the GUI may be configured to receive user input to specify characteristics of the data stored in the fragment itself, which may be used to create the predicate portion of a rule. For example, in these embodiments, a user may a text string that appears in the data to be a part of the rule.

In some embodiments, a GUI is not used to create the rules. In some embodiments, the rules may be created by a user using a command line interface, or any other suitable text based entry. Some embodiments may use a computer executable script to generate a plurality of rules.

Figure 9A:
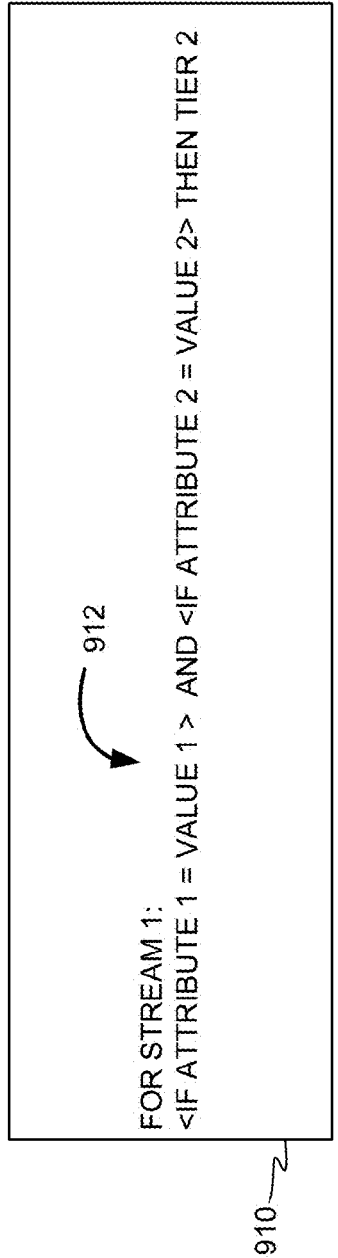
FIG. 9A illustrates an exemplary policy file in accordance with some embodiments.
Figure 9B:
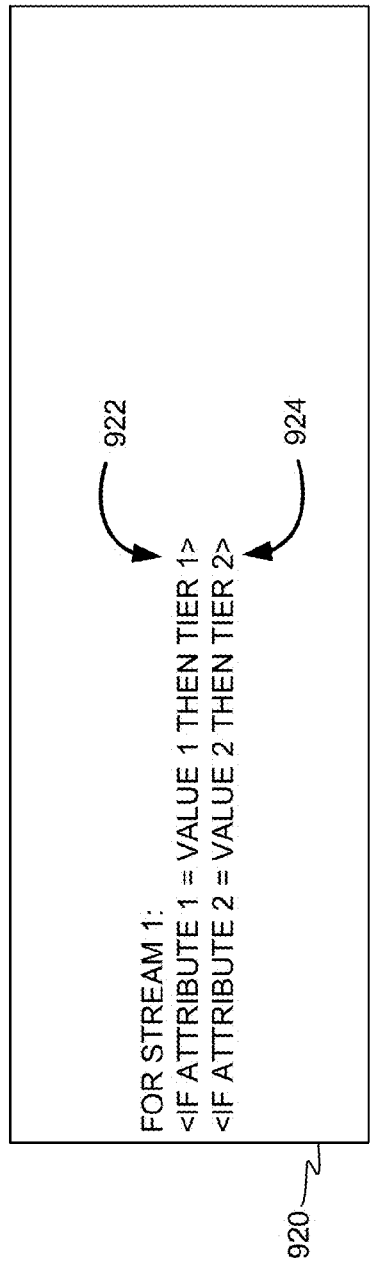
FIG. 9B illustrates a hierarchical policy file in accordance with some embodiments.

FIGS. 9A and 9B illustrate two embodiments of a policy used in a multi-tier OAS system. FIG. 9A illustrates a policy file 910 with a single rule 912 including two criteria joined by a logical operator. The rule 912, when executed, will select "Tier_2" as the storage tier for a fragment, here identified as Stream_1, if the metadata for Stream 1 indicates that the name-value pair "Attribute 1=Value 1" and "Attribute 2=Value 2". Rule 912 uses the logical operation "AND" in the rule.

FIG. 9B illustrates a policy 920 with a hierarchical rule 922. The policy is hierarchical in that, if the preferred tier is not available to perform the storage operation, then a secondary tier is indicated. For example, rule 922 indicates that if the name-value pair for stream 1 is "Attribute 1=Value 1," then the fragment of stream 1 should be stored in Tier 1. However, if a storage tier is not selected as a result of evaluating rule 922, a storage tier may be selected by evaluation of rule 924. Evaluation of rule 922 may not result in a selection of a storage tier for any of a number of reasons, including because the criteria in the predicate portion of the rule are not met or because the storage tier specified in the result portion of the rule in unavailable. In this example, if tier 1 is unavailable or otherwise cannot handle the storage operation command, the policy indicates that if "Attribute 2=Value 2," then the fragment of stream 1 should be stored in tier 2.

By way of example, in some embodiments a hierarchical rule may specify that if the fragment being stored is an x-ray, then the fragment should be stored in a system capable of implementing compression. However, in this embodiment, if the compression-enabled storage is unavailable, the rule may indicate that because the location of the host computer implementing the storage operation is in Boston, i.e., a second name-value pair, the fragment should be stored in a system with metadata indicating the system is located in Boston.

FIGS. 9A and 9B illustrate particular embodiments of a policy. Other embodiments may differ in their implementation. For example, some embodiments may implement a policy using an Extensible Markup Language (XML) format. Other embodiments may use a table or database format.

It should be appreciated that the above-described embodiments for storing fragments of objects in a multi-tier OAS system and the above-described embodiments for generating a policy may be used separately or may be used together in any suitable way.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser./Pat. No. | Filing/Issue Date |
| --- | --- | --- |
| Content Addressable Information, Encapsulation, Representation, And Transfer | 6,807,632 | Oct. 19, 2004 |
| Access To Content Addressable Data Over A Network | 09/235,146 | Jan. 21, 1999 |
| System And Method For Secure Storage Transfer And Retrieval Of Content Addressable Information | 6,976,165 | Dec. 13, 2005 |
| Method And Apparatus For Data Retention In A Storage System | 10/731,790 | Dec. 9, 2003 |

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 10:
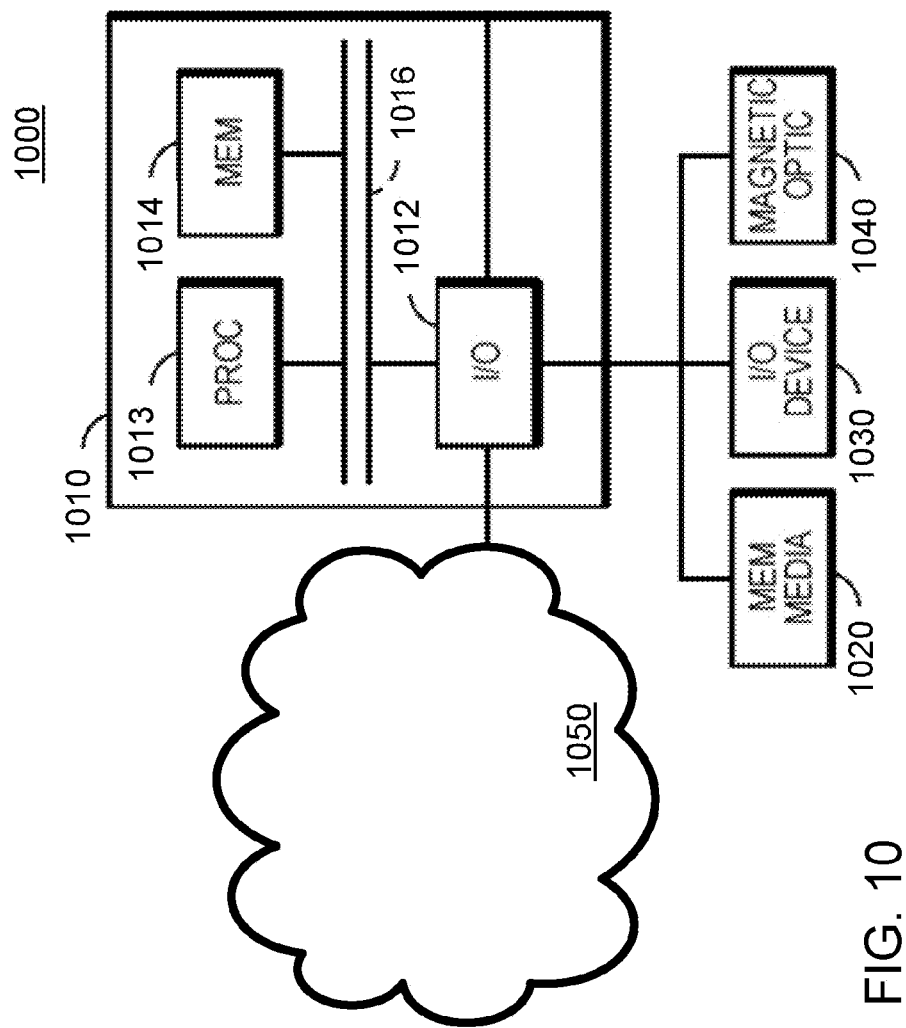
FIG. 10 is a diagram of an exemplary computing environment in accordance with some embodiments.

By way of example, FIG. 10 illustrates an exemplary computing environment 1000 that may be used in some embodiments. The computer 1010 comprises an input/output interface 1012, a processor 1013 and a memory 1014. The components of computer 1010 communicate via a bus 1016.

Program code is loaded onto computer 1010 via any available input device. The input/output interface 1012 allows computer 1010 to communicate with memory media 1020, input/output device 1014 and magnetic/optic storage device 1040. Program code is loaded from any of these devices to memory 1014 for execution by processor 1013.

Input/output interface 1012 also allows computer 1010 to interface with network 1050. As such, computer 1010 communicates with any other device attached to network 1050, including host computers, OAS controllers and storage systems.

Figure 11:
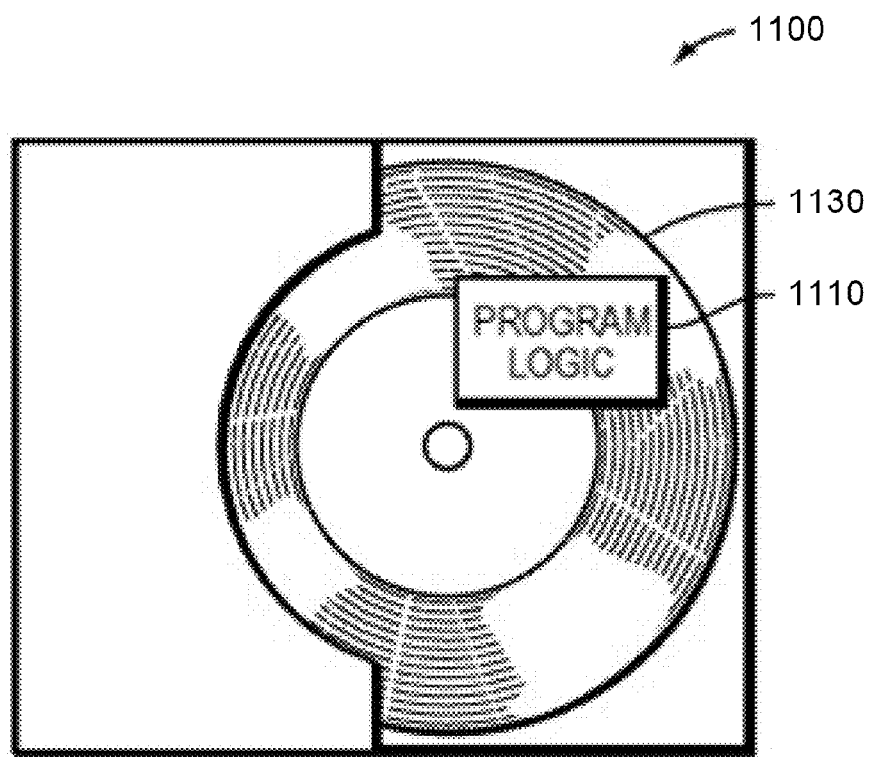
FIG. 11 is a diagram of an exemplary computer readable medium in accordance with some embodiments.

FIG. 11 shows program logic 1110 embodied on a computer-readable medium 1130 as shown, and wherein the logic is encoded in computer-executable code configured for carrying out the processes of this invention and thereby forming a computer program product 1100. The logic 1110 is the same logic loaded on memory 1014 and executed on processor 1013. The program logic 1110 is embodied in software modules, as modules, and/or as hardware modules.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, in some embodiments, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

In some embodiments, such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, in some embodiments, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, in some embodiments, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computers or other processors to implement various aspects of the present invention as discussed above. As used herein, the term "computer-readable storage medium" encompasses only a computer-readable medium that may be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

In some embodiments, computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, in some embodiments, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operation of an object addressable storage system that stores a plurality of objects and provides an object addressable interface via which at least some of the plurality of objects are accessible, wherein an object accessible via the object addressable interface is accessible via an object identifier, and the object addressable storage system is implemented in a tiered storage environment comprising a plurality of storage tiers, the method comprising:
based on a command provided to the object addressable interface to perform a storage operation on at least one portion of the object:
accessing metadata associated with the at least one portion of the object;
accessing a policy; and
selecting a storage tier of the at least one portion of the object based on the policy and the metadata associated with the at least one portion of the object.

2. The method of claim 1, wherein:
selecting the storage tier of the object based on the policy comprises executing at least one rule in the policy.

3. The method of claim 2, wherein:
each of the plurality of storage tiers is associated with one or more storage capabilities; and
the at least one rule of the policy is based on the one or more storage capabilities of at least one of the plurality of storage tiers.

4. The method of claim 2, wherein:
the at least one portion of the object is associated with at least one attribute; and
the at least one rule of the policy is based on the at least one attribute of the at least one portion of the object.

5. The method of claim 4, wherein the at least one rule specifies that, when the at least one attribute is equal to a first value indicating that the at least one portion of the object is fixed, the at least one portion of the object should be stored in a first storage tier that is a fixed content storage system.

6. The method of claim 5, wherein the at least one rule specifies that, when the at least one attribute is equal to a second value indicating that the at least one portion of the object is not fixed, the at least one portion of the object should be stored in a second storage tier that is a transactional storage system.

7. The method of claim 2, wherein the at least one rule is a hierarchical rule.

8. The method of claim 7, wherein the at least one hierarchical rule:
specifies a first storage tier for the at least one portion of the object; and
specifies a second storage tier for the at least one portion of the object for use when the first storage tier is unavailable.

9. The method of claim 2, wherein selecting a storage tier comprises:
selecting a default storage tier when no rule applies to the at least one portion of the object.

10. An object addressable storage system that stores a plurality of objects, wherein each of the plurality of objects is accessible via an object identifier, wherein the object addressable storage system is implemented in a tiered storage environment comprising a plurality of storage tiers, the object addressable storage system comprising:
an interface via which at least some of the plurality of objects are accessible, the interface configured to, in response to a command to perform a storage operation on at least one portion of an object:
access metadata associated with the at least one portion of the object;
access a policy; and
select a storage tier of the at least one portion of the object based on the policy and the metadata associated with the at least one portion of an object.

11. The object addressable storage system of claim 10, wherein:
selecting the storage tier of the at least one portion of an object based on the policy comprises executing at least one rule in a policy file.

12. The object addressable storage system of claim 11, wherein:
each of the plurality of storage tiers is associated with one or more storage capabilities; and the at least one rule of the policy file, when executed, indicates a type of storage capability the storage tier of the at least one portion of the object should have.

13. The object addressable storage system of claim 11, wherein:
   the at least one portion of the object is associated with at least one attribute; and
   the at least one rule of the policy, when executed, selects a storage tier based on the at least one attribute of the at least one portion of the object.

14. The object addressable storage system of claim 11, wherein the at least one rule is a hierarchical rule that:
   specifies a first storage tier for the at least one portion of the object; and
   specifies a second storage tier for the at least one portion of the object in case the first storage tier is unavailable.

15. At least one non-transitory computer readable medium encoded with computer executable instruction that, when executed by a computer, perform a method for use in an object addressable storage system that stores a plurality of objects and provides an object addressable interface via which at least some of the plurality of objects are accessible, wherein an object accessible via the object addressable interface is accessible via an object identifier, and the object addressable storage system is implemented in a tiered storage environment comprising a plurality of storage tiers, the method comprising:
   in response to a command provided to the object addressable interface to perform a storage operation on at least one portion of an object:
      accessing metadata associated with the at least one portion of an object;
      accessing a policy; and
      selecting a storage tier of the at least one portion of the object based on the policy and the metadata associated with the at least one portion of an object.

16. The at least one non-transitory computer readable medium of claim 15, wherein:
   selecting the storage tier of the at least one portion of an object based on the policy comprises executing at least one rule in a policy file.

17. The at least one non-transitory computer readable medium of claim 16, wherein:
   each of the plurality of storage tiers is associated with one or more storage capabilities; and
   the at least one rule of the policy file, when executed, indicates a type of storage capability the storage tier of the at least one portion of the object should have.

18. The at least one non-transitory computer readable medium of claim 16, wherein:
   the at least one portion of the object is associated with at least one attribute; and
   the at least one rule of the policy, when executed, selects a storage tier based on the at least one attribute of the at least one portion of the object.

19. The at least one non-transitory computer readable medium of claim 16, wherein the at least one rule is a hierarchical rule that:
   specifies a first storage tier for the at least one portion of the object; and
   specifies a second storage tier for the at least one portion of the object in case the first storage tier is unavailable.

20. The at least one non-transitory computer readable medium of claim 16, wherein selecting a storage tier comprises:
   selecting a default storage tier when no rule applies to the at least one portion of the object.

\* \* \* \* \*